(12) United States Patent
Lee

(10) Patent No.: US 6,323,997 B1
(45) Date of Patent: Nov. 27, 2001

(54) BINOCULAR WITH ADJUSTABLE BODIES

(76) Inventor: Chun-Mao Lee, No. 12, Lane 89, Shih Tung Rd., Taipei (TW)

( * ) Notice: Subject to any disclaimer, the term of this patent is extended or adjusted under 35 U.S.C. 154(b) by 0 days.

(21) Appl. No.: 09/705,828

(22) Filed: Nov. 6, 2000

(51) Int. Cl.$^7$ ................................................. G02B 23/00
(52) U.S. Cl. ........................... 359/412; 359/410; 359/416
(58) Field of Search ................................. 359/404–416, 359/480–482, 426, 694, 696–698; D16/130–134

(56) References Cited

U.S. PATENT DOCUMENTS

| Re. 30,665 | * | 7/1981 | Altenheiner et al. | 359/410 |
|---|---|---|---|---|
| D. 425,922 | * | 5/2000 | Huckenbeck | D16/133 |
| 4,030,808 | * | 6/1977 | Hornschu et al. | 359/416 |
| 4,186,992 | * | 2/1980 | Kamaura | 359/412 |
| 4,325,602 | * | 4/1982 | Lange | 359/412 |
| 4,463,252 | * | 7/1984 | Brennan et al. | 250/214 VT |
| 4,659,194 | * | 4/1987 | Swartz | 359/410 |

FOREIGN PATENT DOCUMENTS

| 2326088 | * | 11/1974 | (DE) | 359/416 |

* cited by examiner

Primary Examiner—Thong Nguyen
(74) Attorney, Agent, or Firm—Bacon & Thomas PLLC

(57) ABSTRACT

A binocular is constructed to include a bridge, the bridge having two rows of knuckles aligned at two opposite lateral sides thereof, two bodies respectively pivoted to the bridge at two sides, the bodies each having a row of knuckles respectively coupled to the knuckles of the bridge, and two pivot bolts respectively fastened to the knuckles of the bridge and the knuckles of the bodies to couple the bodies to the bridge, for enabling the bodies to be turned relative to the bridge to the desired angle.

5 Claims, 3 Drawing Sheets

BINOCULAR WITH ADJUSTABLE BODIES

BACKGROUND OF THE INVENTION

1. Field of the Invention

The present invention relates to a binocular having two bodies and a bridge joining the bodies and, more specifically, to such a binocular in which the two bodies each have a row of knuckles respectively pivoted to the respective knuckles at two sides of the bridge.

2. Description of the Related Art

A regular binocular, as shown in FIG. 1, is generally comprised of two bodies 2 and a bridge 1 joining the bodies 2. The bodies 2 each comprise a coupling block 20 respectively coupled to the bridge 1. The bridge 1 comprises two front recessed portions and two rear recessed portions. The coupling block 20 of each body 2 comprises a screw hole 204 disposed at the front side, and a recessed portion disposed near the rear side and aimed at the screw hole 204. Two first steel balls 12 are respectively mounted in the recessed portions of the coupling blocks 20 of the bodies 2 and the rear recessed portions of the bridge 1. Two second steel balls 14 are respectively mounted in the front recessed portions of the bridge 1 and aimed at the screw holes 204 of the coupling blocks 20 of the bodies 2. Two holding down screws 22 are respectively threaded into the screw holes 204 of the coupling blocks 20 of the bodies 2 to hold down the second steel balls 14 in the front recessed portions of the bridge 1. When assembled, the bodies 2 can be turned relative to the bridge 1 to adjust their angular position. The binocular further comprises a central focusing wheel 16 revolvably mounted in the bridge 1, a screw rod 18 threaded into the central focusing wheel 16 and disposed between and in parallel to the bodies 2, and a connecting block 19 fixedly fastened to the screw rod 18 and connected between the lens systems 24 of the bodies 2. When rotating the central focusing wheel 16, the screw rod 18 is driven to move the connecting block 19 forwards or backwards relative to the central focusing wheel 16, and therefore the lens systems 24 of the bodies 2 are moved with the connecting block 19 axially in the bodies 2 to adjust the focusing of the binocular. According to this design, the contact area between the bridge 1 and the coupling blocks 20 of the bodies 2 is limited to few points (the steel balls), i.e., the steel balls 12 and 14 and the holding down screws 22 support the whole gravity of the binocular. When the binocular receives an impact, the connecting area between the bridge 1 and the coupling blocks 20 of the bodies 2 tend to be broken. In order to eliminate this problem, the coupling blocks 20 of the bodies 2 and the bridge 1 must be made of material of high structural strength. However, the use of high structural strength material greatly increases the cost of the binocular. Further, the processing of the recessed portions of the bridge and the coupling blocks of the bodies requires high precision, and the steel balls may fall out of the recessed portions during installation. Because the complicated processing and installation procedure consumes much time and labor, the manufacturing cost of this structure of binoculars is high.

SUMMARY OF THE INVENTION

The present invention has been accomplished under the circumstances in view. It is one object of the present invention to provide a binocular, which is strong and durable in use. It is another object of the present invention to provide a binocular, which is inexpensive to manufacture. According to the present invention, the binocular comprises a bridge, the bridge having two rows of knuckles aligned at two opposite lateral sides thereof, two bodies respectively pivoted to the bridge at two sides, the bodies each having a row of knuckles respectively coupled to the knuckles of the bridge, and two pivot bolts respectively fastened to the knuckles of the bridge and the knuckles of the bodies to couple the bodies to the bridge, for enabling the bodies to be turned relative to the bridge to the desired angle. Because each body has multiple knuckles arranged in a row and connected to respective knuckles at the bridge by a pivot bolt, the connecting area between the bodies and the bridge is strong.

DETAILED DESCRIPTION OF THE PREFERRED EMBODIMENT

Figure 1:
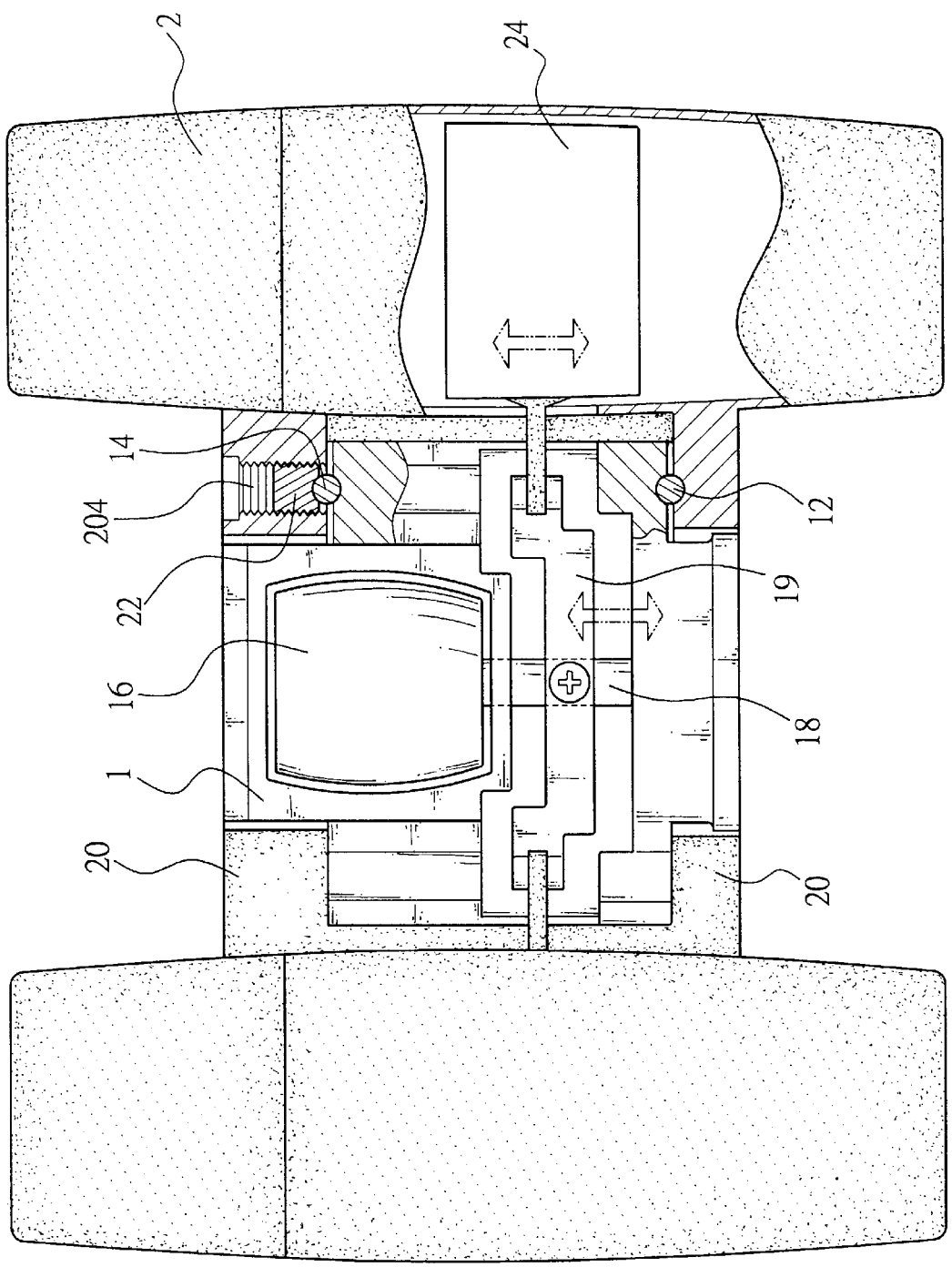
FIG. 1 is a sectional plain view of a binocular according to the prior art
Figure 2:
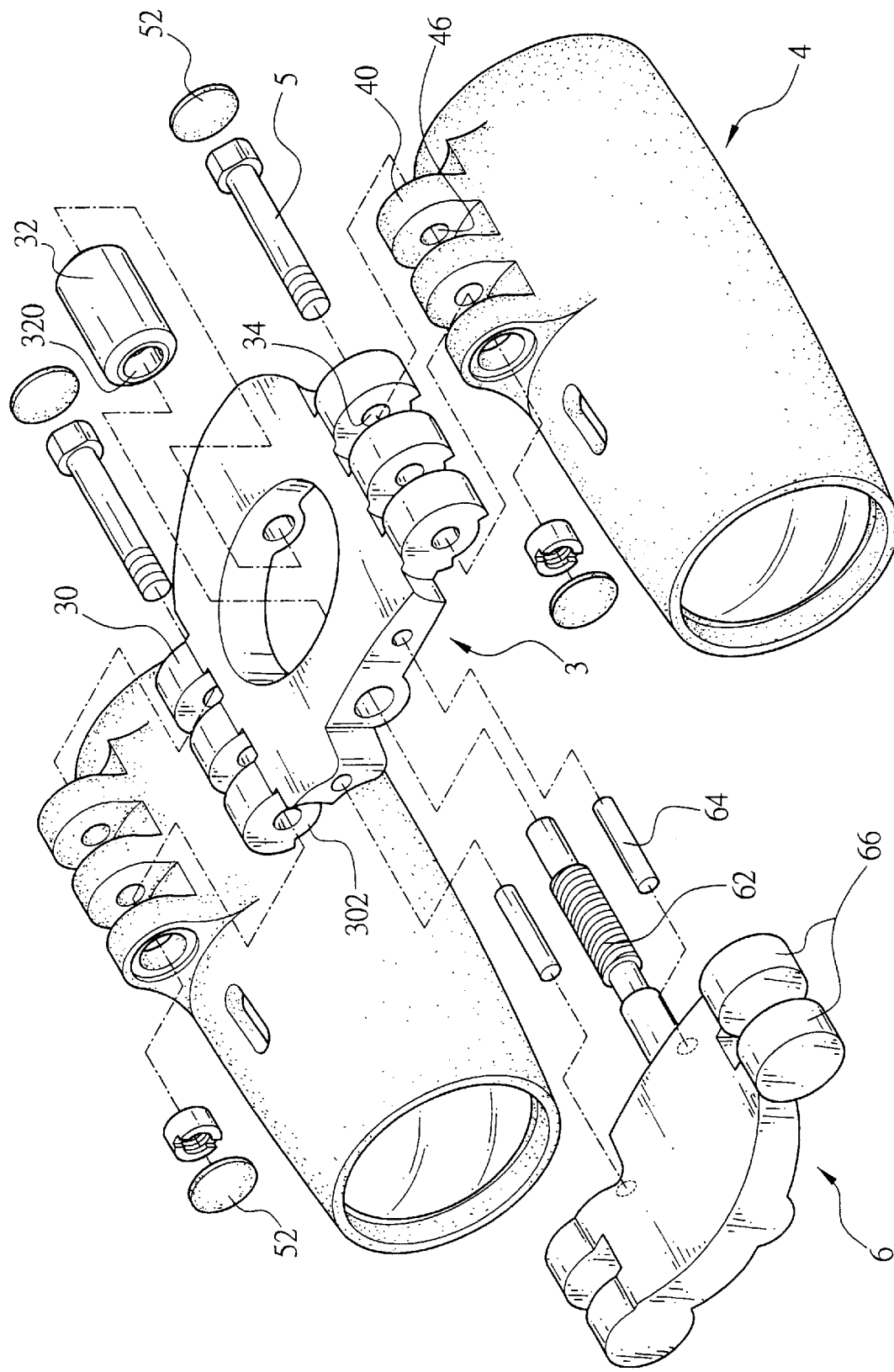
FIG. 2 is an exploded view of a binocular according to the present invention.
Figure 3:
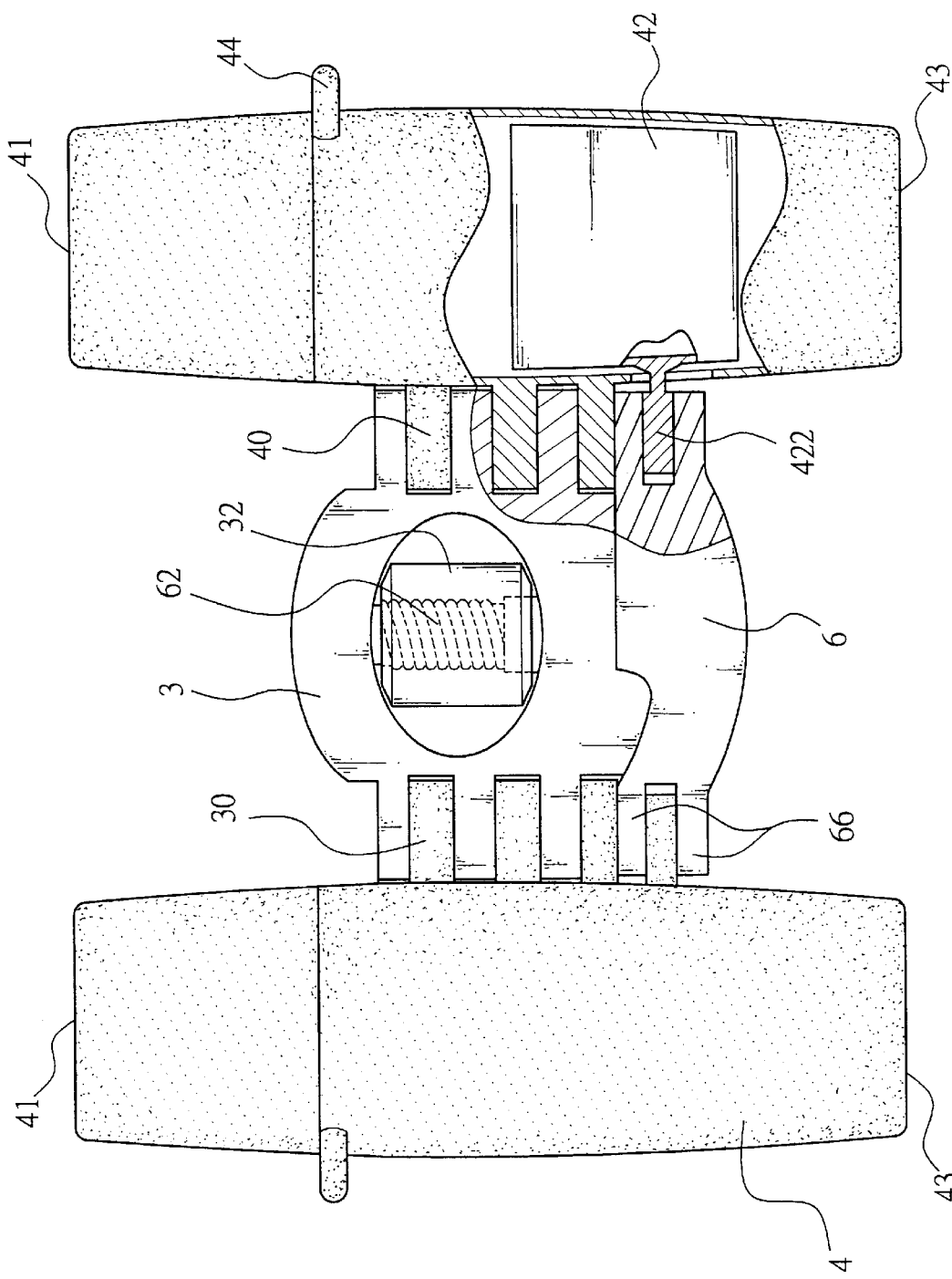
FIG. 3 is a sectional plain view of the binocular shown in FIG. 2.

Referring to FIGS. 2 and 3, a binocular in accordance with the present invention is (generally comprised of two bodies 4, and a bridge 3. The bridge 3 comprises two rows of knuckles 30 arranged long two opposite lateral sides thereof, each knuckle 30 defining a pivot hole 34. The bodies 4 are identical, each comprising a longitudinal row of knuckles 40 integral with the periphery, each knuckle 40 defining a pivot hole 46. Two pivot bolts 5 are respectively mounted in the pivot holes 34 of the knuckles 30 of the bridge 30 and the pivot holes 46 of the knuckles 40 of the bodies 4 to connect the bridge 3 to the bodies 4, enabling the bodies 4 to be turned relative to the bridge 3 to the desired angle. Because each body 4 has multiple knuckles 40 coupled to the respective knuckles 30 at the bridge 3, the connection between the bridge 3 and each body 4 does not break easily upon an impact.

Similar to regular binoculars, each body 4 comprises an eyepiece atone end, an objective lens at an opposite end, a porro prism and a lens system aligned between the eyepiece and the objective lens. By means of this arrangement, each body 4 is capable of making distant objects appear nearer and larger. Further, a central focusing drive is required for adjusting the focusing of the lens system of each body 4. According to the present invention, the central focusing drive comprises a central focusing wheel 32 mounted in the bridge 3, a movable block 6 coupled between the central focusing wheel 32 and the lens systems 42 of the bodies 4. The lens system 42 is positioned between the eyepiece 41 and objective lens 43 of each of the bodies 4. When rotating the central focusing wheel 32 clockwise or counterclockwise, the movable block 6 is moved axially relative to the bridge 3 between the bodies 4 to move the lens system 42 forwards or backwards in the bodies 4 so as to adjust the focus.

The central focusing wheel 32 comprises a female coupling means or device 320. The movable block 6 comprises a male coupling means or device 62 coupled to the female coupling means 320 of the bridge 3. Stop means 64 is provided between the central focusing wheel 32 and the movable block 6, and adapted to stop the movable block 6 from rotary motion, keeping the movable block 6 to be moved axially. According to the present preferred embodiment, the female coupling means 320 of the central focusing wheel 32 is a screw hole, and the male coupling means 62 of the movable block 6 is a screw rod. The screw hole 320 of the central focusing wheel 32 is threaded onto the screw rod 62 of the movable block 6. The movable block 6 further comprises a plurality of coupling portions 66 symmetrically disposed at two opposite lateral sides. The lens system 42 of each body 4 has coupling portions 422 respectively coupled to the coupling portions 66 at one lateral side of the movable block 6. Therefore, when rotating the central focusing wheel 32, the movable block 6 is driven to move the lens system 42 of each body 4 axially forwards or backwards.

The knuckles 30 of the bridge 3 each have a female guide means, for example, an arched guide groove 302 adapted to guide rotary motion of the bodies 4 within a limited angle. The knuckles 40 of the bodies 4 each have a male guide means, for example, a protruded guide flange (not shown) coupled to the female guide means of the knuckles 30 of the bridge 3. The protruded guide flanges of the knuckles 40 are moved with the bodies 4 in the arched guide grooves 302 of the knuckles 30 of the bridge 3 between two ends to limit the turning angle of the bodies 4 relative to the bridge 3.

Each body 4 further comprises an eyelet 44 for the mounting of a hanging rope. Further, ornamental cushions 52 are respectively fastened to two distal ends of each pivot bolt 5.

Because the two eyes of the user may have different eyesight, a special measure must be taken to balance the eyesight of the eyes. According to the present preferred embodiment, the position of the eyepiece of one body 4 can be adjusted axially relative to the corresponding lens system 42, and the eyepiece of the other body 4 is not adjustable. By means of adjusting the movable eyepiece, the focusing of the user's eyes is balanced.

It is to be understood that the drawings are designed for purposes of illustration only, and are not intended for use as a definition of the limits and scope of the invention disclosed.

What the invention claimed is:

1. A binocular comprising:

a bridge, said bridge comprising two rows of knuckles aligned at two opposite lateral sides thereof;

two bodies pivotally attached to the lateral sides of said bridge, said bodies each comprising a row of knuckles respectively coupled to a respective one of the row of the knuckles of said bridge;

an adjustable eyepiece disposed at a first end thereof of each of the bodies;

an objective lens disposed at a second end thereof of each of the bodies;

a lens system positioned inside each of said bodies between said eyepiece and said objective lens;

two pivot bolts, each of the pivot bolts extending through the knuckles of said bridge and the knuckles of said bodies to couple said bodies to said bridge without any gaps between the knuckles of said bridge and the knuckles of said bodies, while enabling said bodies to be turned relative to said bridge;

a central focusing drive rotatively mounted in said bridge rotatable by a user;

the movable block attached to the lens system of each of the bodies; and a movable block coupled to said central focusing wheel, the movable block in communication with the central focusing drive, such that when the central focusing drive is rotated, the movable block is movable towards or away from the bridge, such that the lens system of the bodies is moved inside the bodies to enable proper focus of the binocular.

2. The binocular of claim 1, wherein said central focusing wheel comprises a female coupling device, said movable block comprises a male coupling device coupled to the female coupling device for enabling said movable block to be moved upon rotary motion of said central focusing wheel, and a stop device is provided between said central focusing wheel and said movable block to stop said movable block from rotary motion and to guide said movable block to move axially between said bodies relative to said bridge upon rotary motion of said central focusing wheel.

3. The binocular of claim 2, wherein the female coupling device of said central focusing wheel is a screw hole, and the male coupling device of said central focusing wheel is a screw rod threaded into the screw hole of said central focusing wheel.

4. The binocular of claim 1, wherein said movable block comprises coupling device symmetrically disposed at two opposite lateral sides thereof, and the lens system of each of said bodies has coupling device coupled to the coupling device of the movable block at one lateral side of said movable block for synchronous movement with said movable block.

5. The binocular of claim 1, wherein said pivot bolts each have two distal ends respectively covered with a decorative cushion.

* * * * *